United States Patent [19]
Bassine

[11] Patent Number: 5,968,236
[45] Date of Patent: Oct. 19, 1999

[54] VALVE FREE OXYGEN CONCENTRATOR

[76] Inventor: Stuart Bassine, 1800 Marina Cir., North Fort Myers, Fla. 33903

[21] Appl. No.: 09/026,518

[22] Filed: Feb. 20, 1998

[51] Int. Cl.⁶ .................................................. B01D 53/04
[52] U.S. Cl. .................................. 96/130; 96/133; 96/144
[58] Field of Search ........................ 95/130; 96/108–116, 96/130, 133, 144

[56] References Cited

U.S. PATENT DOCUMENTS

| | | | |
|---|---|---|---|
| 3,182,435 | 5/1965 | Axt | 96/114 |
| 3,313,092 | 4/1967 | Potts | 96/113 |
| 3,740,928 | 6/1973 | Schmid | 96/113 |
| 3,880,616 | 4/1975 | Myers et al. | 96/115 X |
| 3,922,149 | 11/1975 | Ruder et al. | 95/130 X |
| 4,169,715 | 10/1979 | Eriksson | 96/114 |
| 4,222,750 | 9/1980 | Gauthier et al. | 95/130 X |
| 4,331,455 | 5/1982 | Sato | 95/130 X |
| 4,354,859 | 10/1982 | Keller, II et al. | 95/130 X |
| 4,428,372 | 1/1984 | Beysel et al. | 95/130 X |
| 4,449,990 | 5/1984 | Tedford, Jr. | 96/115 X |
| 4,455,861 | 6/1984 | Alftine | 96/144 X |
| 4,491,459 | 1/1985 | Pinkerton | 96/113 |
| 4,530,705 | 7/1985 | Firey | 96/116 |
| 4,534,346 | 8/1985 | Schlaechter | 96/144 X |
| 4,892,566 | 1/1990 | Bansal et al. | 96/115 X |
| 5,166,563 | 11/1992 | Bassine | 95/130 X |
| 5,228,888 | 7/1993 | Gmelin et al. | 95/130 X |
| 5,340,381 | 8/1994 | Vorih | 96/114 X |
| 5,370,728 | 12/1994 | LaSala et al. | 95/130 X |
| 5,474,595 | 12/1995 | McCombs | 96/109 X |
| 5,679,134 | 10/1997 | Brugerolle et al. | 96/130 X |

Primary Examiner—Robert Spitzer
Attorney, Agent, or Firm—William E. Noonan

[57] ABSTRACT

A valve free oxygen concentrator includes first and second nitrogen filters. Air is pumped into and through the first filter while the second filter is simultaneously evacuated. Alternately, air is pumped into and through the second filter while the first filter is simultaneously evacuated. The filters extract nitrogen from the air pumped therethrough to produce concentrated oxygen. The extracted nitrogen is subsequently exhausted from the filters. The concentrated oxygen is directed from the filters to a patient or other destination that requires concentrated oxygen.

12 Claims, 3 Drawing Sheets

VALVE FREE OXYGEN CONCENTRATOR

FIELD OF INVENTION

This invention relates to a valve free oxygen concentrator, which is particularly suited for use in medical applications.

BACKGROUND OF INVENTION

Oxygen concentrators have long been used to provide highly concentrated oxygen to medical patients and for other applications. These devices normally employ a pair of molecular sieve filter tanks that remove nitrogen from the air and produce a highly concentrated oxygen supply for the patient. For example, see the concentrator and accompanying sieve tanks disclosed in U.S. Pat. No. 5,166,563. Conventional concentrators typically require either a pair of 3-way valves or a single 4-way valve to integrate the concentrator pump with the molecular sieve tanks. These valves require a fairly complicated construction, which includes numerous hoses, clamps and fittings. This adds considerably to the cost, bulk and weight of the system. Moreover, such valves tend to exhibit leaks, which can render the entire concentrator useless. As a result, most concentrators experience considerable "down time" in order to undergo necessary repairs.

The valves used in conventional oxygen concentrators are typically timer driven. The required timing mechanisms further increase the cost and complexity of most concentrators. Moreover, known concentrators are often far less than optimally efficient.

SUMMARY OF INVENTION

It is therefore an object of the present invention to provide an oxygen concentrator that eliminates the valves normally required to operably interconnect the concentrator pump and the molecular sieve tanks.

It is a further object of this invention to provide an oxygen concentrator that eliminates the problems normally associated with standard concentrator valves and timers, including the complexity, expense, bulk and weight, which typically accompany the use of these components.

It is a further object of this invention to provide an oxygen concentrator that is significantly simpler, less expensive and lighter weight than previously known concentrators.

It is a further object of this invention to provide an oxygen concentrator that operates much more efficiently and reliably than conventional oxygen concentrators.

It is a further object of this invention to provide an oxygen concentrator that avoids the frequent breakdowns of conventional concentrators and which requires significantly less maintenance.

It is a further object of this invention to provide an oxygen concentrator that efficiently achieves improved concentrated oxygen production.

This invention results from the realization that the complexity, cost and weight of an oxygen concentrator may be reduced considerably and at the same time the efficiency of the concentrator may be improved by eliminating the valves and timers employed by conventional devices and using instead one or more reversible rotary compressors that alternately pressurize and evacuate respective nitrogen filter sieve beds. This process efficiently extracts nitrogen from the air pumped into each filter and subsequently exhausts the nitrogen and prepares the filter so that the process may be continuously repeated. Valves and timers are thereby not needed to pressurize and evacuate the respective filters or to exhaust nitrogen from the filters.

This invention features an oxygen concentrator that includes a nitrogen filter and a rotary compressor communicably connected to the filter. A reversible motor drives the compressor in a forward direction to pump air into and through the filter and alternately drives the compressor in a reverse direction to evacuate the filter. As a result, the filter extracts nitrogen from the air pumped therethrough to produce concentrated oxygen, and the extracted nitrogen is exhausted from the filter by the compressor.

In a preferred embodiment, the means for driving includes a reversible motor. Means may be provided for directing the concentrated oxygen to a destination requiring such oxygen. The compressor may include port means for introducing air into and discharging air from the compressor. The port means may include first and second ports. The compressor is driven in the forward direction to drive air into the compressor through the first port and to discharge air from the compressor through the second port. The compressor is driven in the reverse direction to draw air into the compressor through the second port and discharge air from the compressor through the first port. The filter may include an inlet to which the compressor is connected and an outlet that is communicably connected to the means for directing. Conduit means may interconnect the second port of the compressor and the inlet of the filter.

This invention also features an oxygen concentrator that includes first and second nitrogen filters. Means are provided for pumping air into and through the first filter while simultaneously evacuating the second filter, and alternately pumping air into and through the second filter while evacuating the first filter. The filters extract nitrogen from the air pumped therethrough to produce concentrated oxygen and the extracted nitrogen is exhausted from the filters. Means are provided for directing the concentrated oxygen from the filters to a destination that requires concentrated oxygen.

Preferably, the means for pumping and evacuating include a first rotary compressor communicably connected to the first filter, a second rotary compressor communicably connected to the second filter and means for driving the first and second compressors in alternating forward and reverse directions. Specifically, the first compressor is driven in a forward direction to pump air into and through the first filter, while the second compressor is simultaneously driven in a reverse direction to evacuate the second filter. Alternately, the first compressor is driven in a reverse direction to evacuate the first filter while the second compressor is simultaneously driven in a forward direction to pump air into the second filter. As a result, the filters alternately extract nitrogen from the air pumped therethrough to produce concentrated oxygen and the extracted nitrogen is then alternately exhausted from the filters by the respective compressors.

In the dual filter embodiment, the means for driving again may include a reversible motor. Typically, a single, reversible motor is operably connected to both compressors. Each of the compressors may include port means and each of the filters may include inlets and outlets as described above. Additionally, a conduit may be interconnected between each compressor and a respective one of the filters. The means for directing may include one or more needle valves or other one-way valve means for transmitting concentrated oxygen therethrough. The means for directing may further include means for mixing concentrated oxygen produced by the first and second filters, respectively.

BRIEF DESCRIPTION OF THE DRAWINGS

Other objects, features and advantages will occur from the following description of preferred embodiments and the accompanying drawings in which.

DETAILED DESCRIPTION OF PREFERRED EMBODIMENTS

Figure 1:
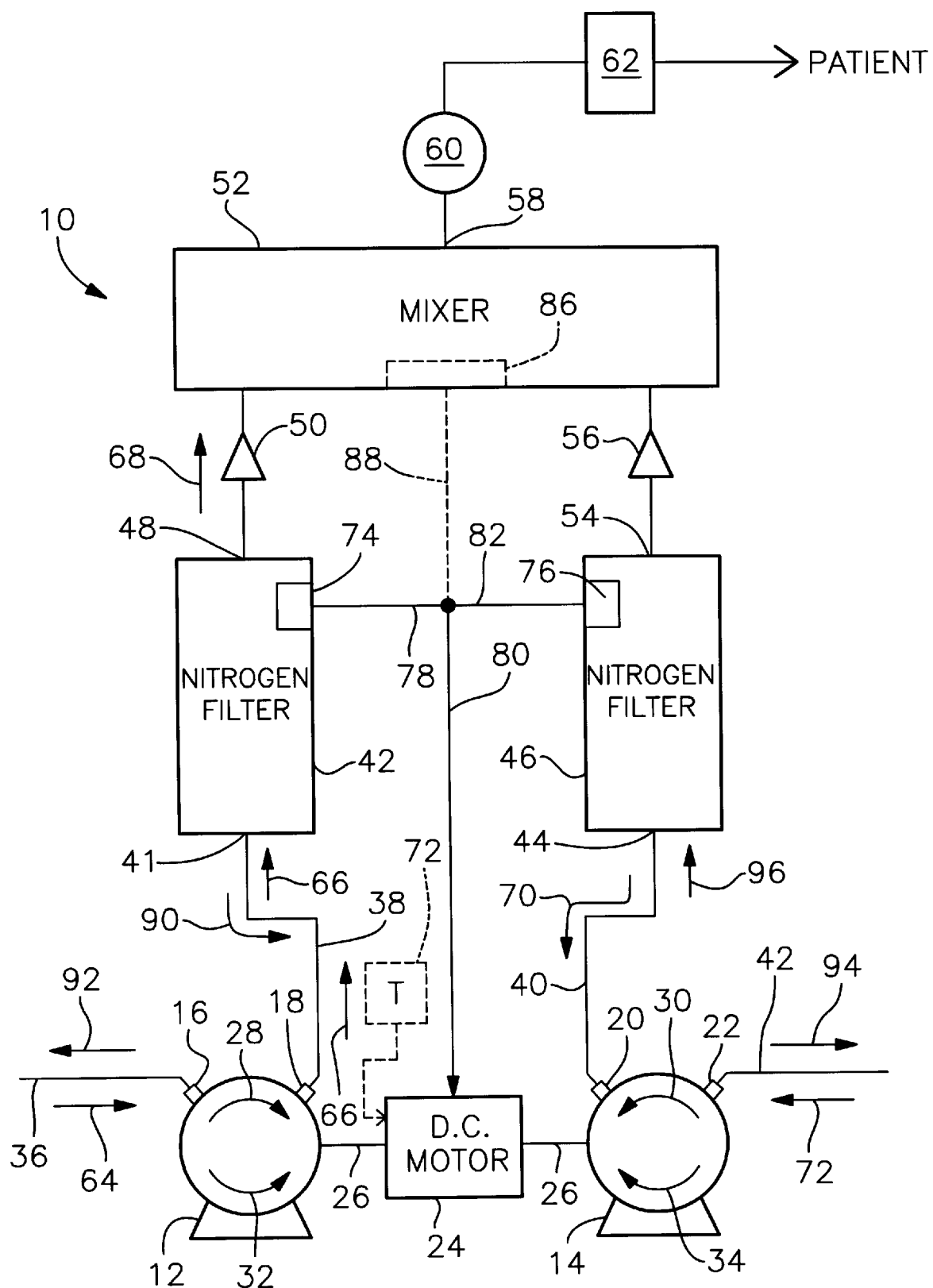
FIG. 1 is a schematic view of a preferred valve free oxygen concentrator according to this invention, which includes a pair of rotary compressors and respective nitrogen filters.

There is shown in FIG. 1 a valve free oxygen concentrator 10 that employs a pair of conventional rotary compressors or pumps 12 and 14. Compressors 12 and 14 may comprise various known types of rotary compressors including, but not limited to, sliding carbon vane rotary compressors and pivoting vane rotary compressors, as are shown and described in U.S. Pat. No. 5,188,524. The internal construction and operation of each compressor will be identical or analogous to known compressors and should be understood to those skilled in the art. In particular, each compressor includes an internal rotor mounted eccentrically within a chamber and carrying a plurality of vanes that compress air as the rotor turns within the chamber. Compressor 12 includes a pair of ports 16 and 18 through which air is introduced into and discharged from the compressor in an alternating fashion that is described more fully below. Similarly, compressor 14 includes a pair of ports 20 and 22 for introducing air into and discharging air from compressor 14. The compressors are structurally equivalent; port 16 corresponds to port 20 and port 18 corresponds to port 22.

Figure 2:
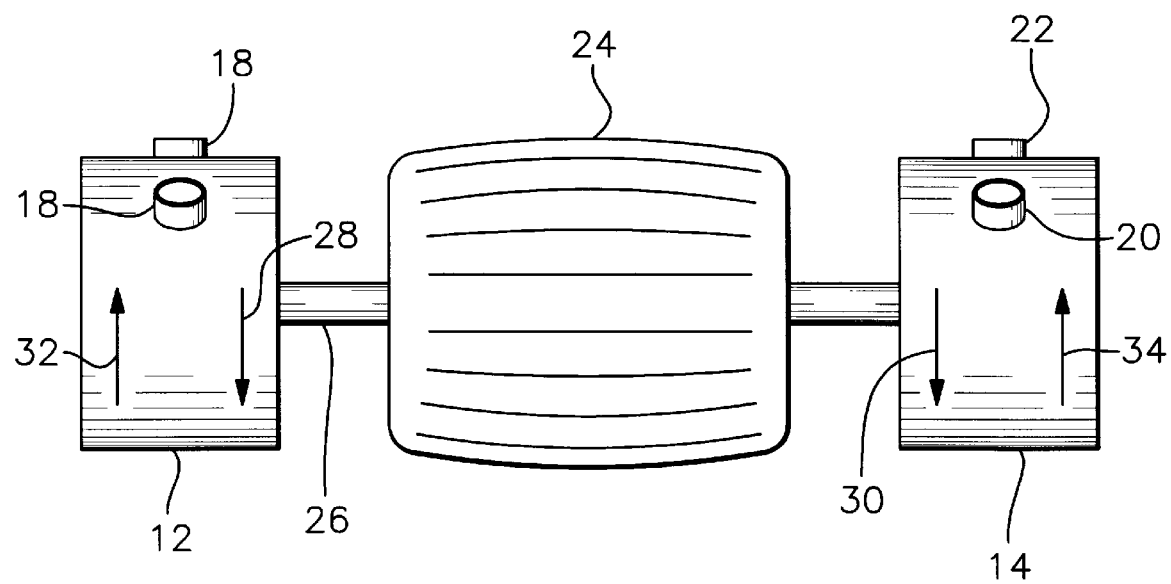
FIG. 2 is an elevational view of the reversible motor and interconnected rotary compressors used in the preferred concentrator of this invention.

Each of the compressors 12 and 14 is operably connected to and driven by a reversible, brushless, DC motor 24. This comprises a standard twin head motor of the type that will be known to persons skilled in the art. As shown in FIG. 2, motor 24 includes an axial drive shaft 26 that is interconnected in a known manner to the axial rotor shafts of compressors 12 and 14, respectively. The motor sequentially reverses, either periodically at predetermined intervals or when predetermined gas pressures are achieved. Specifically, when the motor operates in one direction, shaft 26 drives compressor 12 rotatably in the direction of arrow 28 (hereinafter the forward direction), shown in FIG. 1. Simultaneously, the drive shaft operates compressor 14 in the direction of arrow 30 (hereinafter the reverse direction). When motor 24 reverses, compressor 12 is driven in the reverse direction indicated by arrow 32 in FIG. 1 and compressor 14 is driven in the forward direction indicated by arrow 34.

As is known in the prior art, when the rotor of compressor 12 is turned in the direction of arrow 28, air is drawn into the compressor through line 36 and inlet 16. That air is compressed and pumped out of compressor 12 through port 18 and line 38. Alternatively, when the motor 24 drives the rotor of compressor 12 in the direction of arrow 32, air is drawn into the compressor through line 38 and port 18, and then exhausted from the compressor through port 16 and line 36. Compressor 14 operates in an analogous manner. When motor 24 turns the rotor of compressor 14 in the direction of arrow 30, the compressor draws in air through line 40 and port 20. Such air is discharged through port 22 and line 42. Alternatively, when the motor drives compressor 14 in the opposite direction (arrow 34), air is drawn into the compressor through line 42 and port 22. That air is compressed and pumped out of compressor 14 through port 20 and line 40.

Line 38 comprises a conduit that communicably interconnects port 18 of compressor 12 with an inlet 41 of a first nitrogen filter 42. The nitrogen filter is a standard molecular sieve bed of the type commonly used in oxygen concentrators. Similarly, line 40 comprises a conduit that communicably interconnects port 20 of compressor 14 with an inlet 44 of second nitrogen filter 46. This filter again includes a standard molecular sieve bed.

Conventional means operably interconnect filters 42 and 46 to a patient or other destination requiring concentrated oxygen. In particular, an outlet 48 of filter 42 is connected through a one-way needle valve 50 to a standard oxygen concentrator mixing tank 52. Likewise, outlet 54 of filter 46 is connected through a one-way needle valve 56 to mixer 52. The output 58 of mixer 52 is directed through a standard regulator 60 and flow meter 62 to, for example, a patient needing concentrated oxygen.

In operation, motor 24 is started and driven in a reversible manner. For example, initially shaft 26 is rotated to drive the rotor of compressor 12 in forward direction 28. Simultaneously, the motor drives the rotor of compressor 14 in the reverse direction 30. (See also FIG. 2.) Air is drawn into compressor 12 through line 36 and port 16 in the manner indicated by arrow 64, FIG. 1. This air is compressed and pumped out of compressor 12 through port 18 and line 38, as indicated by arrows 66. The compressed air is directed by line 38 into and through filter 42, wherein the air is filtered. Nitrogen is removed by filter 42 and concentrated oxygen is discharged from filter outlet 48 and transmitted through valve 50 and into mixer 52, in the manner indicated by arrow 68.

While the above described process is occurring in compressor 12 and filter 42, compressor 14 simultaneously evacuates the air contained in second filter 46. As the rotor of compressor 14 is driven in the reverse direction of arrow 30, at least a partial vacuum is created in filter 46. Air and any previously extracted nitrogen that are contained in filter 46 are pulled out of that filter through inlet 44 and line 40, as indicated by arrow 70, and are drawn into compressor 14 through port 20. This exhausted gas is then discharged from the compressor through port 22 and line 40, as indicated by arrow 72. Valve 56 prevents concentrated oxygen contained in mixer 52 from being drawn back into filter 46. At this point in the operation of concentrator 10, filter 42 is pressurized to produce concentrated oxygen, whereas filter 46 includes at least a partial vacuum.

As previously indicated, motor 24 periodically and sequentially reverses direction. Such reversal may be initiated by various means. For example, a timer 72, shown in phantom in FIG. 1, may cause motor 24 to reverse direction at predetermined time intervals (e.g. every 8–10 seconds). Alternatively, filters 42 and 46 may be equipped with respective pressure sensing switches 74 and 76 that are designed to detect predetermined pressure or vacuum levels. For example, switch 74 may comprise a pressure sensitive switch. When a predetermined pressure level is sensed in filter 42 (due to compressed air being introduced through that filter), a signal may be sent over lines 78 and 80 to motor 24, which signal causes the motor to reverse direction. In an analogous manner, switch 76 may comprise a vacuum sensitive switch that sends a signal over lines 82 and 80 to motor 24, causing the motor to reverse direction when a predetermined vacuum level is sensed in filter 46. In alternative embodiments, other pressure and/or vacuum sensing switches may be provided in one or both of the filters. In still other versions, a pressure sensitive switch 86 may be contained within mixer 52. When a predetermined pressure level is measured in the mixer, a signal is sent over lines 88 and 80 to motor 24, which causes the motor to reverse direction. Accordingly, the motor may be reversed either at predetermined time intervals or when predetermined pressure and/or vacuum levels are sensed within the respective filters and/or the mixer.

In any event, when motor 24 reverses direction, the compressor rotors are driven by shaft 26 in respective directions that are opposite to those previously described. In the example disclosed herein, the compressor of rotor 12 is driven in the reverse direction of arrow 32 and the rotor of compressor 14 is driven in the forward direction of arrow 34. This causes compressor 12 to draw a vacuum in filter 42. Air and previously extracted nitrogen remaining in filter 42 are evacuated from the filter through line 38, as indicated by arrow 90. This gas is drawn into the compressor through port 18 and is exhausted through port 16 and line 36 in the direction of arrow 92. As during the previously described sequence, valve 50 prevents previously concentrated oxygen from being drawn out of mixer 52 and back into filter 42.

Simultaneously, compressor 14 is driven in the forward direction of arrow 34. Fresh air is drawn into that compressor through line 42 and port 22, as indicated by arrow 94. This air is compressed and pumped out of compressor 14 through port 20 and line 40, as indicated by arrow 96. The compressed air is introduced into previously evacuated filter 46 through inlet 44. Filter 46 is pressurized and the compressed air is filtered. Nitrogen is extracted and concentrated oxygen is discharged through outlet 54. This oxygen is delivered through one-way valve 56 to mixer 52. Accordingly, the mixing tank receives concentrated oxygen alternately from filters 42 and 46.

Motor 24 continues operating in the second direction for either the previously described predetermined time period or until a predetermined pressure and/or vacuum has been sensed in the filters and/or mixer. At such a point, an appropriate signal is sent to motor 24, which again causes the motor to reverse direction. The motor again operates in the first direction, as previously described, and the entire sequence is repeated continuously to provide a steady supply of concentrated oxygen to mixer 24. During the first half of the cycle (while motor 24 is operated in the first direction) filter 42 removes nitrogen from the air pumped into that filter by compressor 12 to produce concentrated oxygen, while a vacuum is simultaneously drawn in filter 46. During the second half of the motor's cycle, the reverse occurs. Air is pumped by compressor 14 through filter 46 to produce concentrated oxygen and filter 42 is evacuated by compressor 12.

Concentrated oxygen is directed from mixer 52 to the patient or other destination requiring such oxygen in a conventional manner. Specifically, the oxygen is conducted from mixer outlet 58 through regulator 60 and flow meter 62, as required.

Concentrator 10 eliminates the standard 3-way and 4-way valves and associated timers that are conventionally required for directing compressed air to and between a plurality of molecular sieve bed filters. As a result, the complexity, weight and expense of concentrator 10 are significantly less than most standard devices. The two stage pressurization/evacuation process utilized by concentrator 10 also significantly improves the efficiency of the apparatus. Each filter is evacuated before compressed air is pumped through that filter. As a result, the incoming compressed air encounters little if any resistance. Energy efficiency is improved considerably and a smaller horsepower motor may be employed. Each time the motor reverses, the compressor utilizes the pressure or vacuum that it has created during the prior half-cycle to initiate turning of its rotor in the reverse direction. The power consumption normally required during start-up of the rotor is reduced considerably. As a result, the motor may be powered by either a standard stationary DC power source or a portable source, such as a battery or the 12 volt system of an automobile.

Figure 3:
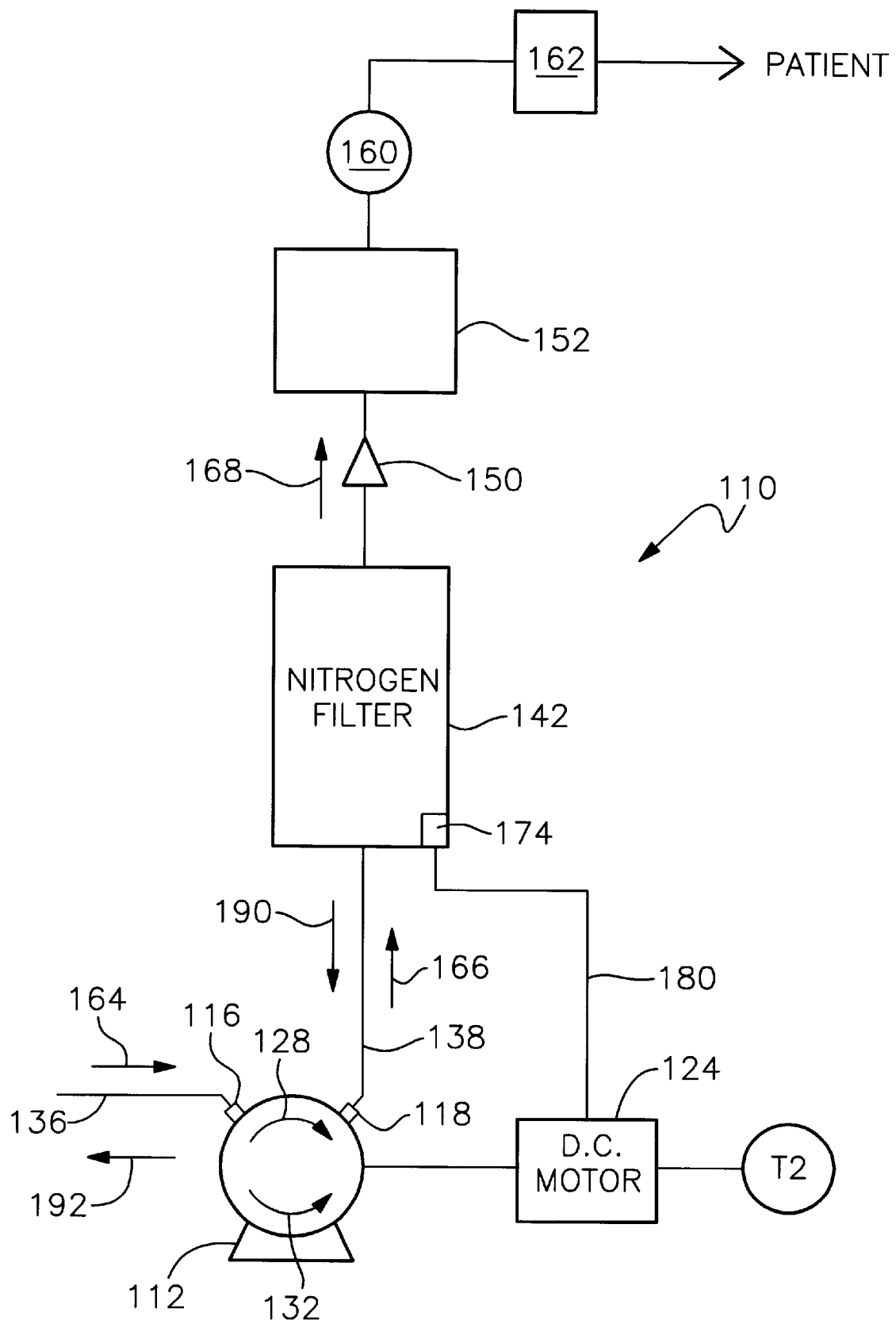
FIG. 3 is a schematic view of an alternative oxygen concentrator in accordance with this invention, which comprises a single rotary compressor and associated filter.

FIG. 3 illustrates an alternative embodiment of this invention, wherein concentrator 110 features a single compressor 112 and associated filter 142. Compressor 112 comprises a standard rotary compressor of the type previously described. The compressor is driven in opposing forward and rearward directions 128 and 132, respectively, by a standard brushless DC motor 124. When the compressor is driven in the direction of arrow 128, air is introduced into the compressor, in the direction of arrow 164, through line 136 and port 116. This air is compressed and discharged from the compressor through port 118 and line 138. The compressed air is directed, as indicated by arrow 166, into a nitrogen filter 142. Again, this filter comprises a standard molecular sieve bed of the type commonly used in oxygen concentrators. The filter extracts nitrogen and produces concentrated oxygen, which is delivered, as indicated by arrow 168, through a one-way valve 150 and into a holding tank 152. The concentrated oxygen is provided, as required, through regulator 160 and flow meter 162 to a patient requiring oxygen.

When a switch 174 recognizes a predetermined pressure level in filter 142, a signal is sent over line 180 to motor 124, which causes the motor to reverse direction. Such reversal may also be directed at predetermined times by a signal from timer T2. In either event, when the motor reverses direction, the rotor of compressor 112 is driven in the reverse direction of arrow 132. This causes the compressor to draw a vacuum on filter 142. Any remaining air and extracted nitrogen are drawn out of filter 142 and through line 138, in the direction of arrow 190. This gas is then drawn into compressor 112 through port 118 and exhausted from the compressor through port 116 and line 136, in the direction of arrow 192. As in the previously described embodiment, valve 150 prevents concentrated oxygen contained in tank 152 from being drawn back into filter 142. Motor 124 continues driving compressor 112 in the direction of arrow 132 for a predetermined time period or until a predetermined reduced pressure or vacuum level is sensed. The sequence then reverses once again and the motor and compressor operate in the first, forward direction so that fresh oxygen is produced. This sequence repeats continuously to provide concentrated oxygen to the patient.

In the second described embodiment, similar benefits are achieved. The complexity, weight and expense of valves interconnecting the compressor and filter are eliminated. Additionally, during each cycle, a vacuum is created in the filter before fresh compressed air is pumped through the filter. This reduces the work required of the motor and pump, and improves the efficiency of the concentrator considerably.

Although specific features of the invention are shown in some drawings and not others, this is for convenience only, as each feature may be combined with any or all of the other features in accordance with the invention.

Other embodiments will occur to those skilled in the art and are within the following claims:

What is claimed is:

1. An oxygen concentrator comprising:

first and second nitrogen filters;

a first rotary compressor that is communicably connected to said first filter and a second rotary compressor that is communicably connected to said second filter; and a single reversible motor, which motor is operably connected to both said first rotary compressor and said second rotary compressor, said motor driving said first compressor in a forward direction to pump air into and through said first filter while simultaneously driving said second compressor in a reverse direction to evacuate said second filter, and alternately driving said first compressor in a reverse direction to evacuate said first filter while simultaneously driving said second compressor in a forward direction to pump air into and through said second filter, whereby said filters alternately extract nitrogen from the air pumped therethrough to produce concentrated oxygen, and the extracted nitrogen is alternately exhausted from said filters by said first and second compressors.

2. The apparatus of claim 1 in which said motor includes an axial drive shaft and said first and second compressors include respective axial rotor shafts, said drive shaft of said motor being operably interconnected to each of said rotor shafts.

3. An oxygen concentrator comprising:

first and second nitrogen filters;

a first rotary compressor that is communicably connected to said first filter and a second rotary compressor that is communicably connected to said second filter;

a single reversible motor, which motor is operably connected to both said first rotary compressor and said second rotary compressor, said motor driving said first compressor in a forward direction to pump air into and through said first filter while simultaneously driving said second compressor in a reverse direction to evacuate said second filter, and alternately driving said first compressor in a reverse direction to evacuate said first filter while simultaneously driving said second compressor in a forward direction to pump air into and through said second filter, whereby said filters alternately extract nitrogen from the air pumped therethrough to produce concentrated oxygen, and the extracted nitrogen is alternately exhausted from said filters by said first and second compressors; and means for directing the concentrated oxygen in the absence of a timing valve from said first and second filters to a destination that requires concentrated oxygen.

4. The apparatus of claim 3 in which said motor includes an axial drive shaft and said first and second compressors include respective axial rotor shafts, said drive shaft of said motor being operably interconnected to each of said rotor shafts.

5. The concentrator of claim 3 in which each said compressor includes port means for introducing air into and discharging air from said compressor.

6. The concentrator of claim 4 in which said port means include first and second ports, said compressor being driven in the forward direction to draw air into said compressor through said first port and discharge air from the compressor through the second port, said compressor being driven in the reverse direction to draw air into the compressor through the second port and discharge air from the compressor through the first port.

7. The concentrator of claim 6 in which each filter includes an inlet to which a respective one of said compressors is connected and an outlet that is communicably connected to said means for directing.

8. The concentrator of claim 7 further including first conduit means for interconnecting said second port of said first compressor and said inlet of said first filter, and second conduit means for interconnecting said second port of said second compressor and said inlet of said second filter.

9. The concentrator of claim 3 in which said means for directing includes one-way valve means for transmitting concentrated oxygen from said filters therethrough.

10. The concentrator of claim 3 in which said means for directing include means for mixing concentrated oxygen produced by said first and second filters.

11. An oxygen concentrator comprising:

first and second nitrogen filters;

a first rotary vane compressor that is communicably connected to said first filter and a second rotary vane compressor that is communicably connected to said second filter;

a single reversible motor, which motor is operably connected to both said first rotary vane compressor and said second rotary vane compressor, said motor driving said first compressor in a forward direction to pump air into and through said first filter while simultaneously driving said second compressor in a reverse direction to evacuate said second filter, and alternately driving said first compressor in a reverse direction to evacuate said first filter while simultaneously driving said second compressor in a forward direction to pump air into and through said second filter, whereby said filters alternately extract nitrogen from the air pumped therethrough to produce concentrated oxygen, and the extracted nitrogen is alternately exhausted from said filters by said first and second compressors; and means for directing the concentrated oxygen in the absence of a timing valve from said first and second filters to a destination that requires concentrated oxygen.

12. The apparatus of claim 11 in which said motor includes an axial drive shaft and said first and second compressors include respective axial rotor shafts, said drive shaft of said motor being operably interconnected to each of said rotor shafts.

* * * * *